United States Patent [19]
Wobschall

[11] Patent Number: 5,644,125
[45] Date of Patent: Jul. 1, 1997

[54] SPECTROMETER EMPLOYING A MACH ZEHNDER INTERFEROMETER CREATED BY ETCHING A WAVEGUIDE ON A SUBSTRATE

[75] Inventor: Darold Wobschall, Williamsville, N.Y.

[73] Assignee: Research Foundation of State University NY, Albany, N.Y.

[21] Appl. No.: 344,184

[22] Filed: Nov. 23, 1994

[51] Int. Cl.$^6$ .................................................. G01B 9/02
[52] U.S. Cl. ........................ 250/227.27; 250/227.18; 356/345
[58] Field of Search ................ 250/227.27, 227.12, 250/227.14, 227.18; 356/345, 346, 354

[56] References Cited

U.S. PATENT DOCUMENTS

| | | | |
|---|---|---|---|
| 4,183,669 | 1/1980 | Doyle | 356/346 |
| 4,538,910 | 9/1985 | Doyle | 356/346 |
| 4,548,464 | 10/1985 | Auracher et al. | 385/7 |
| 4,558,951 | 12/1985 | Ludman et al. | 356/346 |
| 4,601,579 | 7/1986 | Pritchard et al. | 356/346 |
| 4,761,048 | 8/1988 | Gregoris et al. | 385/14 |
| 5,021,661 | 6/1991 | Masutani | 356/346 |
| 5,196,903 | 3/1993 | Masutani | 356/346 |
| 5,251,008 | 10/1993 | Masutani | 356/346 |
| 5,262,842 | 11/1993 | Gauglitz | 356/345 |
| 5,349,437 | 9/1994 | Bobb | 250/227.27 |
| 5,422,721 | 6/1995 | Ryan | 356/346 |

OTHER PUBLICATIONS

1992 Proceedings: Sensors Expo, "Integrated Optic Sensors for Industry", pp. 1–11 John G. Edwards.

IEE Proceedings, vol. 131, Pt. H. No. 5, Oct. 1984 "Thermo-Optic Waveguide Interferometric Modulator/Switch in Glass." M. Haruna, Prof Koyama pp. 322–324.

M. Haruna, J. Koyama, Thermo-Optic Waveguide Interferometric Modulator/Switch in Glass, IEEE Proceedings, vol. 131, Pt. H No. 5 Oct. 1984.

*Primary Examiner*—Stephone Allen
*Attorney, Agent, or Firm*—Christine Johnson, Esq.

[57] ABSTRACT

A planar optic sensor for measuring the optical absorbance spectrum of a side variety of substances in situ comprises a planar waveguide Mach-Zehnder interferometer having a reference path and a sensing path. The sensing path of the waveguide is exposed to the sample under test, the sample interacting with the guided light via emanations from the light as it propagates through the sensing path. The reference path of the waveguide is provided with a heater that linearly varies over time the refractive index of the reference path material, in this manner varying the optical path length of the reference path. Fourier spectroscopic techniques are applied to compare the spectrum of a white light source without a sample present in the sensing path to the spectrum of the white light source in the presence of a sample in the sensing path, as the optical path length of the reference path is swept over time. From these data the absorption spectrum of the sample is determined.

10 Claims, 2 Drawing Sheets

SPECTROMETER EMPLOYING A MACH ZEHNDER INTERFEROMETER CREATED BY ETCHING A WAVEGUIDE ON A SUBSTRATE

BACKGROUND OF THE INVENTION

1. Field of the Invention

This invention relates generally to the field of spectroscopy, and more particularly to a compact planar optic sensor capable of providing spectroscopic measurements of the complete optical absorbance spectrum of substances in the visible, ultraviolet, and/or infrared range.

2. Description of the Related Art

Spectroscopy is the measurement of the mount of light, or other radiant energy, transmitted, absorbed, or emitted by a sample of matter, as a function of the frequency or wavelength of the radiation. Either the absorption or the emission spectra can provide information on the atomic or molecular structure of a sample. For a general discussion of spectroscopy see Fundamentals of Optics, Francis A. Jenkins, Harvey E. White, McGraw Hill 1976, hereby incorporated by reference.

Infrared spectroscopy is the study of vibrational transitions. Its qualitative application is to the identification of species by interpreting their infrared fingerprint, i.e., their characteristic vibrational absorption spectrum. This is in contrast to other spectroscopic techniques developed to determine emission spectra.

Spectrometers have been used for many years as analytical instruments. Many infrared spectrometers are based on well known interferometer schemes as described in *Fundamentals of Optics*, and are widely available commercially. These instruments consist of a source of infrared light, emitting radiation throughout the whole frequency range of the instrument. This light is split into two beams of equal intensity, and one beam is arranged to pass through the sample to be examined. If the frequency of a vibration of the sample molecule falls within the range of the instrument, the molecule may absorb energy of this frequency, or wavelength, from the light. The spectrum is derived by comparing the intensity of the two beams after one has passed through the sample to be examined.

The Mach-Zehnder interferometer is one of many used in this well-established field. In a Mach-Zehnder interferometer, a single-mode beam is split into physically separate signal and reference branches that are subsequently rejoined to create an interference signal. For a Mach Zehnder interferometer, the difference in the optical path length of the signal and reference circuits is given by $N_{seff}L_s - N_{reff}L_r$ where $N_{seff}$ is the effective index of refraction of the signal circuit, $L_s$ is the physical path length of the signal circuit, $N_{reff}$ is the effective index of refraction of the reference circuit and $L_s$ is the physical path length of the reference circuit. Since these four parameters can be varied independently, both refractive index effects and physical path length effects can be sensed with Mach-Zehnder devices.

The output of an interferometer, as a function of time, is the Fourier transform of the light source spectrum, as a function of frequency. This principle forms the basis of the well-known infrared Fourier transform spectrometer. In a typical arrangement, light from a continuum source passes through an absorption cell containing the molecule of interest, and then through an interferometer. The interferometer's output intensity, as measured by an appropriate detector, is digitized then transferred to a computer, which calculates the Fourier transform of the data to produce the spectrum. Because of this feature the technique is generally referred to as Fourier transform spectroscopy.

However, the infrared Fourier spectrometers in use today have certain drawbacks that render them less useful than they might be as sensors or in field applications. A typical spectrometer is generally a large and expensive precision laboratory instrument. Further, the sample to be tested must be brought into the laboratory. Thus, while infrared Fourier spectroscopy provides an ideal method of material identification, sample presentation, large size and cost of manufacture of the spectrometer discourage the application of this technology outside the laboratory setting.

It would be highly desirable to apply a compact, inexpensive, easy to use spectroscopic instrument to sense and measure, for example, low level chemical concentrations in a wide variety of samples in situ.

Several small spectroscopic instruments for measuring electromagnetic radiation are known. The reduction in the size of these instruments has been achieved using known planar waveguide technology. This technology provides the ability to generate optical systems in a chip format somewhat analogous to integrated electronic circuits. It offers the advantage of small size and mechanical stability, and allows the employment of cost favorable manufacturing methods such as photolithography. In addition, passive elements such as lenses, mirrors, beam splitters and couplers can be incorporated through the use of gratings, graded index profiles, variations in layer thickness, discrete coatings and other low production cost techniques.

One example of the use of planar waveguide technology in an optical instrument for measuring electromagnetic radiation is the Frequency Analyzer in Planar Waveguide Technology and Method of Manufacture of Auracher, et al., U.S. Pat. No. 4,548,464. Another is the Integrated Optics Spectrum Analyzer of Gregoris et al, U.S. Pat. No. 4,761,048.

Further, the Fiber Fourier Spectrometer disclosed by Ludman et al., U.S. Pat. No. 4,558,95, provides for a relatively small instrument for spectroscopic measurements of wavelengths and intensities of electromagnetic radiation from a multiple wavelength source, e.g., the flame of a rocket exhaust. It is implemented on a block of electro-optical material having beam paths formed within.

A need remains for a compact spectroscopic instrument capable of sensing, identifying and measuring the optical absorbance spectrum of substances that are not themselves sources of electromagnetic radiation.

U.S. Pat. No. 5,262,842 discloses an integrated optical interferometer for detecting substances including hydrocarbons. This patent teaches a Mach-Zehnder interferometer having a measuring arm and a comparison arm in a waveguide substrate. However, substance identification is not based on spectral analysis of the sample and is thereby limited. Because substance identification depends on the response of the selected superstrate to substance penetration, the range of substances that can be identified with a single such instrument is constrained.

A need remains for a single compact instrument capable of determining the optical absorbance spectrum of a wide variety of substances in situ.

SUMMARY OF THE INVENTION

It is an object of the invention to provide a sensor for measuring the optical absorbance spectrum of a wide variety of substances in situ, and is produced to be compact, inexpensive to manufacture, and adaptable to wide range of in situ applications.

The sensor includes a planar waveguide Mach-Zehnder interferometer having a reference path and a sensing path. The sensing path of the waveguide is exposed to the sample under test, the sample interacting with the guided light via evanescent tails emanating from the light as it propagates through the sensing path.

The reference path of the waveguide is provided with a heater that can linearly vary over time the refractive index of the reference path material, in this manner varying the optical path length of the reference path.

Fourier spectroscopic techniques are applied to compare the spectrum of a white light source without a sample present in the sensing path to the spectrum of the white light source in the presence of a sample in the sensing path, as the optical path length of the reference path is swept over time. From these data the absorption spectrum of the sample is determined.

DESCRIPTION OF THE PREFERRED EMBODIMENT

Figure 2:
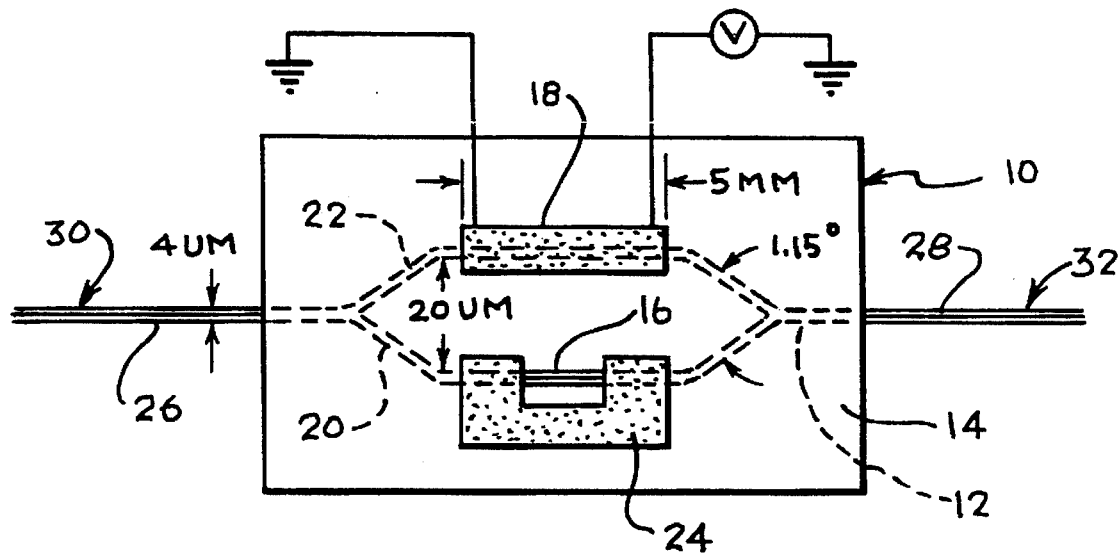
FIG. 2 is a top view of the planar optic sensor.
Figure 1:
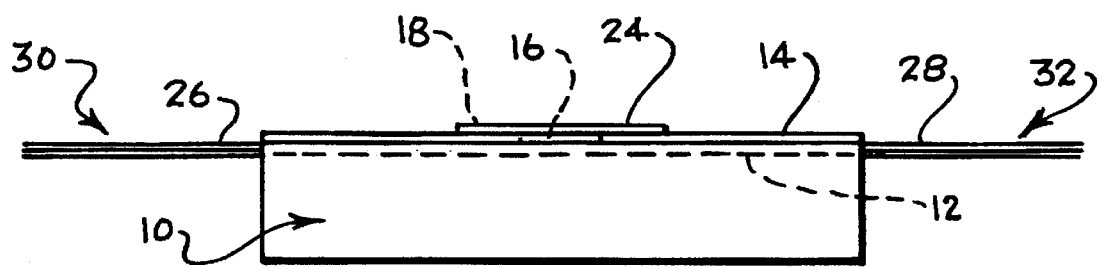
FIG. 1 is a side view of the planar optic sensor.

FIG. 1 depicts a side view of the preferred embodiment of a Planar Optic Sensor. FIG. 2 depicts a top view.

The sensor structure is a planar sandwich of three layers: a supporting substrate 10, a central waveguide 12, and a cladding 14. The substrate material of the preferred embodiment is soda lime glass. The waveguide is fabricated by the known K+ ion exchange technique so as to form a single optical waveguide mode over the wavelength region of interest.

The cladding is a thin layer of $SiO_2$. The cladding is placed over the waveguide except in sample area 16. A Ti-sputtered film heater 18 is subsequently formed over the cladding using known lift-off techniques.

The waveguide is defined using aluminum film and conventional photolithography techniques. The waveguide is a narrow (less than about 4 um) strip of film of slightly higher refractive index material such as aluminum, on the surface of an optically transparent lower index of refraction substrate material, such as soda lime glass. The waveguide has two optical paths, a sensing path 20 and a reference path 22 which are spaced not less than about 10 um apart. Sufficient separation is necessary to maintain a temperature difference between the paths. In the preferred embodiment at least about 20 um is demonstrated. The radius of curvature of any part of either path is large enough so that light is not lost from the guide.

The sensing path, with the exception of the sample area, is covered by a heat sink 24 of the same material and using the same techniques as the heater of the reference path. The substrate, the cladding and the substance in the sample area all have indices of refraction slightly less than that of the waveguide layer. Therefore, light coupled into the input 26 of the waveguide structure by quartz fiber 30 will propagate through the guiding film until it reaches the output 28 of the structure.

The propagating wave fronts of light have small evanescent tails that decay exponentially into the substrate, cladding and substance in the sample area. The effective, or composite index of refraction of the sensing path is dominated by the refractive index of the film of the waveguide. However, the evanescent tails of the light propagating through the sensing path bring in a contribution from the refractive indices of the substrate, the cladding and the substance in the sample area. The depth of penetration of the evanescent tail in the sensing path is a function of the contribution of the sample substance to the index of refraction of the sensing path.

The Ti-sputtered film heater is formed over the reference path. In the preferred embodiment the heater is about 5 mm long. The thickness of the film of the heater can be varied around 5 um to achieve heater resistance of around 7.1 KOhms. The depth of the evanescent wave penetration into the area over the reference path is fixed as the entire path is covered by the cladding and the heater. There is no interaction of the sample with the evanescent wave in the reference path.

A change in the temperature in the reference path induces a change in the index of refraction of the reference path, It is well known that light travels at different speeds in different materials depending on the refractive indices of the materials. Therefore the optical path length $L_r$ of the reference path will vary with changes in its temperature.

$L_r$ is set to be slightly shorter than the optical length $L_s$ of the sensing path when the heater is off; but becoming equal with a moderate temperature rise, and then larger with further temperature increase. By gradually increasing the output of the heater the effective optical path length of the reference path is effectively swept over time from $L_r-\Delta L_r$ to $L_r+\Delta L_r$.

The light traveling within the sensing path and the reference path recombines within the single optical path at the output of the substrate. As the light recombines, it interferes. One end of a second quartz fiber 32 is coupled to the single optical path at the output of the substrate.

Figure 3:
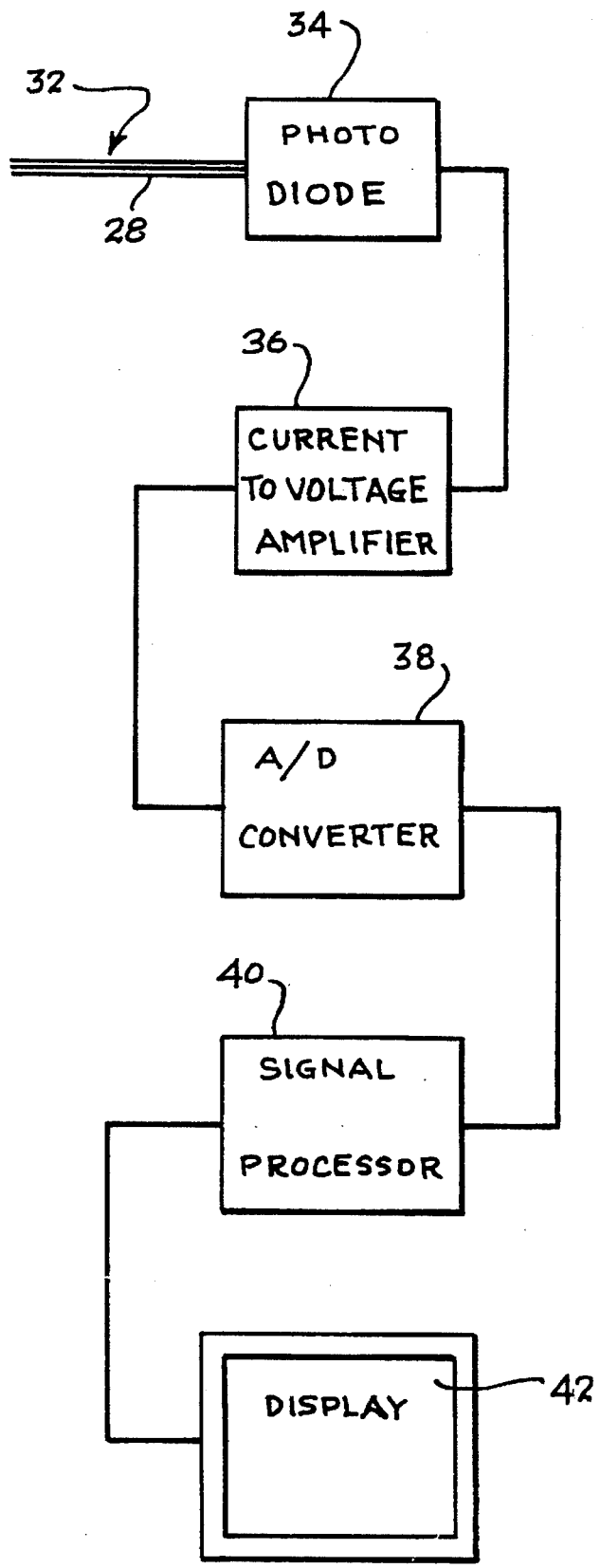
FIG. 3 is a block diagram of the detector, signal conditioner and signal processor.

FIG. 3 shows the detector, signal conditioner and signal processor. The other end of the quartz fiber 32 is connected to a photo diode 34 in the preferred embodiment. The light intensity detected by the photo detector as the temperature in the reference path is swept over time, is a function of the resulting change in $L_r$.

The photo diode converts the optical intensity to current. The current is fed to an amplifier 36, the voltage output of which drives an analog to digital converter 38. The digital signal output of the A/D converter is coupled to a digital signal processor 40 running a commercial software program that calculates the Fast Fourier Transform of the input. "Labview" is one of many well-known commercial signal analysis packages capable of performing the FFT.

These, or other, known Fourier spectroscopic techniques are applied to the output signal to determine the spectrum of the source, first without the sample present in the sample area, then with the sample present. Two sets of data are obtained. One is the intensity spectrum with the sample and the other without the sample. The transmitted spectrum is the ratio of the spectrum with to the spectrum without the sample. First, the Fourier transform of the light intensity is taken during the sweep of the optical path length with no sample present. Thus, the source intensity spectrum is obtained. Second, the Fourier transform of the light intensity during the sweep of the path length with a sample present is taken. Thus, the source intensity spectrum modified by sample absorption is obtained. Third, the absorption spectrum of the sample is determined by taking the difference between the log of the source intensity spectrum without a sample present and the log of the source intensity spectrum with a sample present. Fourth, the peak absorbance of the sample is divided by the peak absorbance of a standard concentration of the chemical being sensed. The concentration of the chemical is recorded as a numerical value and displayed as a numerical value. The final result is shown on display 42.

It is understood that the foregoing description is that of the preferred embodiments of the invention and that various changes and modifications may be made thereto without departing from the spirit and scope of the invention as defined in the appended claims.

I claim:

1. An interfering spectrometer comprising:

a substrate having an input end for receiving white light and an output end;

a waveguide for conducting the white light said waveguide being etched upon said substrate, said waveguide having a plurality of optical paths of nearly equal physical length for passing the white light from the input end of said substrate to the output end of said substrate, at least one of the optical paths being a reference path, and at least one other of the optical paths being a sensing path having a sample area adapted to be exposed to a sample under test, each of the optical paths having an input end and an output end, the input ends of the optical paths being joined together upon the input end of said substrate to form an input path for the white light, the output ends of the optical paths being joined together upon the output end of said substrate to form an output path for recombining the white light from the optical paths;

input coupling means connected to said input path for receiving the white light;

means for linearly varying over time the optical length of at least one of said reference paths, the intensity of the white light at the output path being modulated depending on a phase difference between the light in the reference paths and the light in the sensing paths;

photo detecting means for converting electromagnetic intensity to an electrical signal, said photo detecting means having an input and an output;

an output coupling means for passing recombined white light from said output path to the input of said photo detecting means;

current to voltage conversion means having an input coupled to the output of said photo detecting means, said current to voltage conversion means further having an output;

analog to digital conversion means having an input coupled to the output of said current to voltage conversion means whereby the output of said analog to digital conversion means represents the intensity of the light in said output path;

digital signal processing means having an input coupled to the output of said analog to digital conversion means, said digital signal processing means comprising:

means for calculating the optical intensity of the light in said output path as a function of wavelength;

means for comparing the optical intensity of the light in the output path when a sample is present in the at least one sensing path to the optical intensity of the light in the output path when no sample is present in the at least one sensing path;

means for displaying the results of said comparison.

2. The interfering spectrometer of claim 1 wherein the input coupling means is an optical fiber having two ends, one of said ends optically aligned with the input path, the other of said ends optically aligned with said white light source.

3. The interfering spectrometer of claim 1 wherein the output coupling means is an optical fiber having two ends, one of said ends being optically aligned with the output path.

4. The interfering spectrometer of claim 1 wherein the photo detecting means is a photo diode.

5. The interfering spectrometer of claim 1 wherein the means for linearly varying over time the optical length of at least one of said reference paths is a heater.

6. The interfering spectrometer of claim 1 wherein the means for calculating the optical intensity of the light in the output path utilizes a Fourier spectroscopy technique.

7. An interfering spectrometer according to claim 1 wherein said optical paths are thin film planar structures sandwiched between said substrate and a covering material, said thin film planar structures having a refractive index of said thin film greater than that of both said substrate and the covering material, permitting an evanescent wave to pass therethrough.

8. A method of using a Spectrometer Employing a Mach Zehnder Interferomter created by Etching a Waveguide on a Substrate comprising:

a first step of providing white light at the input channel;

a second step of conducting a first sweep of the optical path length of the reference path when no sample is present in the sample area by varying the temperature of the reference path;

a third step of obtaining a first data set representing the intensity spectrum of said white light during said first sweep by taking the Fourier transform of the light intensity in the output channel during said first sweep;

a fourth step of conducting a second sweep of the optical path length of the reference path when a sample is present in the sample area by varying the temperature of the reference path;

a fifth step of obtaining a second data set representing the intensity spectrum of the white light during said second sweep by taking the Fourier transform of the light intensity in the output channel during said second sweep, and a sixth step of determining the absorption spectrum of the sample by taking the difference between the log of the intensity spectrum obtained during said first sweep and the log of the intensity spectrum obtained during said second sweep.

9. The method of claim 8 further comprising the steps of:

dividing the peak absorbance of the sample by the peak absorbance of a standard concentration of the chemical being sensed;

recording said concentration of the chemical being sensed as a numerical value, and displaying said numerical value.

10. An interfering spectrometer comprising:

an interferometer composed of waveguides etched on a substrate having a reference and a sensing path of nearly equal physical length, said sensing path having a sample area capable of being exposed to the sample under test;

means for nonphysically varying the optical path length of said reference path;

interferometer output means for recombining the light from said reference and sampling optical paths;

photo detecting means coupled to said interferometer output means;

amplifier means coupled to said photo detecting means;

analog to digital converting means coupled to said amplifier means;

digital signal processing means coupled to said analog to digital converting means for calculating the optical intensity of the light output by the interferometer and for comparing the intensity of said light when no sample is present in said sensing path to the intensity of said light when a sample is present in said sensing path;

means for displaying the result of said comparison.

* * * * *